United States Patent
Zhang et al.

(10) Patent No.: US 12,198,677 B2
(45) Date of Patent: Jan. 14, 2025

(54) TECHNIQUES FOR END-TO-END SPEAKER DIARIZATION WITH GENERALIZED NEURAL SPEAKER CLUSTERING

(71) Applicant: Tencent America LLC, Palo Alto, CA (US)

(72) Inventors: Chunlei Zhang, Bellevue, WA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 417 days.

(21) Appl. No.: 17/826,908

(22) Filed: May 27, 2022

(65) Prior Publication Data

US 2024/0013774 A1 Jan. 11, 2024

(51) Int. Cl.
*G10L 15/06* (2013.01)
*G10L 15/16* (2006.01)

(52) U.S. Cl.
CPC ............ *G10L 15/063* (2013.01); *G10L 15/16* (2013.01); *G10L 2015/0631* (2013.01)

(58) Field of Classification Search
None
See application file for complete search history.

(56) References Cited

U.S. PATENT DOCUMENTS

| | | | | |
|---|---|---|---|---|
| 11,626,104 B2* | 4/2023 | Park | | G10L 17/04 704/244 |
| 2018/0075860 A1* | 3/2018 | Parada | | G10L 25/03 |
| 2018/0158463 A1 | 6/2018 | Ge et al. | | |
| 2018/0174600 A1 | 6/2018 | Chaudhuri et al. | | |
| 2020/0152207 A1* | 5/2020 | Wang | | G10L 17/04 |
| 2021/0326421 A1* | 10/2021 | Khoury | | G10L 17/08 |
| 2022/0044687 A1* | 2/2022 | Perret | | G06N 3/045 |
| 2022/0375492 A1* | 11/2022 | Grangier | | G10L 15/063 |
| 2023/0352041 A1* | 11/2023 | Park | | G06N 3/045 |
| 2024/0013774 A1* | 1/2024 | Zhang | | G10L 15/063 |
| 2024/0038255 A1* | 2/2024 | Ando | | G10L 17/18 |
| 2024/0105182 A1* | 3/2024 | Ando | | G10L 15/04 |
| 2024/0160849 A1* | 5/2024 | Fanelli | | G10L 17/18 |

OTHER PUBLICATIONS

Fujita Y, Kanda N, Horiguchi S, Nagamatsu K, Watanabe S. End-to-end neural speaker diarization with permutation-free objectives. arXiv preprint arXiv:1909.05952. Sep. 12, 2019. (Year: 2019).*
International Search Report dated Jan. 5, 2023 in International Application No. PCT/US22/42139.
Written Opinion dated Jan. 5, 2023 in International Application No. PCT/US22/42139.

* cited by examiner

*Primary Examiner* — Jonathan C Kim
(74) *Attorney, Agent, or Firm* — Sughrue Mion, PLLC

(57) ABSTRACT

A method of end-to-end speaker diarization (EESD) using neural speaker clustering, performed by at least one processor, is provided. The method includes generating a set of speech labels corresponding to a set of speakers based on an input stream. The speech labels indicate whether dialogue of a speaker is speech or non-speech. The method further includes generating dialogue based on the set of speakers, extracting speaker embeddings from the dialogue, mapping the speaker embeddings to a cluster identification (ID), an overlapped speech value, or a non-speech value based on a neural network, and outputting EESD labels based on the mapping.

15 Claims, 7 Drawing Sheets

TECHNIQUES FOR END-TO-END SPEAKER DIARIZATION WITH GENERALIZED NEURAL SPEAKER CLUSTERING

BACKGROUND

Field

Apparatuses and methods consistent with example embodiments of the present disclosure relate to an end-to-end speaker diarization (EESD) framework using a generalized neural speaker clustering method to simplify the speaker diarization pipeline system. The method may perform speech activity detection (SAD), overlapped speech detection (OSD), and speaker segmentation/clustering simultaneously, which significantly simplifies the speaker diarization pipeline.

Description of Related Art

Speaker diarization is the process of automatically detecting who spoke when in an audio stream. This is a particularly important technology in many applications such as speaker retrieval in audio/video streams, meeting transcriptions, conversation analysis, etc. Speaker diarization is a sequential process that normally involves several modules such as front-end processing (e.g., speech enhancement or speech separation), speech activity detection (SAD), segmentation/speaker change detection, speaker clustering, and post-processing (e.g., re-segmentation or fusion). In related art, the involved components are separately developed and optimized. Thus, the resulting speaker diarization systems are complicated and lack satisfying generalization capabilities.

In related art, Variational Bayes Hidden Markov Model (VB-HMM) based clustering methods are proposed to handle unknown number of speakers. Using the VB-HMM based clustering method may result in better speaker diarization when employed as a re-clustering procedure. Related art also discuss formulating an unsupervised speaker clustering problem to a supervised learning scheme, where a Transformer based encoder-decoder model is applied to map speaker embeddings to their relative positions. For overlapped speech, overlap-aware re-segmentation, which improves the clustering based baseline on AMI dataset, is performed. Further, in related art, Target-Speaker Voice Activity Detection (TS-VAD) is proposed to act as a post-processing module after the initial speaker clustering. With iterative i-vector extraction and segmentation refinement, impressive diarization performance has been achieved (e.g., in the latest CHIME challenge). Continues Speech Separation (CSS) has also been applied as the front-end processing, which is then followed by a standard speaker diarization pipeline.

Nonetheless, challenges remain in developing the speaker diarization systems. For example, in related art, (i) individual components are optimized separately making module coordination complicated during inference, and (ii) compensation techniques (e.g., speech separation, iterative re-segmentation/re-clustering etc.) must be added to address unknown speaker numbers and overlapped speech which makes the overall system unlikely to have a small-footprint.

SUMMARY

According to embodiments, methods are provided for end-to-end speaker diarization (EESD) using neural speaker clustering to provide the system with audio streams and the corresponding annotations in categories of non-speech, overlapped speech, and active speakers.

According to an aspect of the disclosure, a method for end-to-end speaker diarization (EESD) using neural speaker clustering, performed by at least one processor of a computing device. The method includes generating a set of speech labels corresponding to a set of speakers based on an input stream, wherein a speech label indicates whether dialogue of a speaker is speech or non-speech, generating dialogue based on the set of speakers, extracting speaker embeddings from the dialogue, mapping the speaker embeddings to a cluster identification (ID), an overlapped speech value, or a non-speech value based on a neural network, and outputting EESD labels based on the mapping.

The method may further include determining a speech label in the set of speech labels to be non-speech when a value of the speech label is 0, and determining a speech label in the set of speech labels to be speech when the value of the speech label is 1.

The method may further include converting the speech label in the set of speech labels determined to be speech into an absolute speaker label.

The method may further include wherein a speaker embedding corresponding to the absolute speaker label is mapped to the cluster ID, a speaker embedding corresponding to the speech label determined to be speech is mapped to the overlapped speech value (the overlapped speech value being 1) and a speaker embedding corresponding to the speech label determined to be non-speech is mapped to the non-speech value (the non-speech value being 0).

The method may further include sampling the set of speakers with N utterances for each speaker to generate a speaker subset including the speaker and a corresponding speech label; and adding a first utterance of the speaker and the corresponding speech label to the input stream and the output EESD labels.

The method may further include controlling an overlap length between a current utterance and a corresponding segment of the input stream based on a random variable.

The method may further include training the neural network by: splitting the input stream into segments; performing neural clustering on each of the segments; and assigning each of the segments an existing cluster ID or a new cluster ID based on a predetermined distance threshold.

According to another aspect of the disclosure, an apparatus for end-to-end speaker diarization (EESD) using neural speaker clustering, includes a memory storage storing computer-executable instructions and a processor communicatively coupled to the memory storage. The processor is configured to execute the computer-executable instructions and cause the apparatus to generate a set of speech labels corresponding to a set of speakers based on an input stream, wherein a speech label indicates whether dialogue of a speaker is speech or non-speech, generate dialogue based on the set of speakers, extract speaker embeddings from the dialogue, map the speaker embeddings to a cluster identification (ID), an overlapped speech value, or a non-speech value, based on a neural network, and output EESD labels based on the mapping.

The apparatus may further include wherein the at least one processor is configured to read the program code and operate as instructed by the program code to determine a speech label in the set of speech labels to be non-speech when a value of the speech label is 0, and determine a speech label in the set of speech labels to be speech when the value of the speech label is 1.

The apparatus may further include wherein the at least one processor is configured to read the program code and operate as instructed by the program code to convert the speech label in the set of speech labels determined to be speech into an absolute speaker label.

The apparatus may further include wherein a speaker embedding corresponding to the absolute speaker label is mapped to the cluster ID, a speaker embedding corresponding to the speech label determined to be speech is mapped to the overlapped speech value (the overlapped speech value being 1), and a speaker embedding corresponding to the speech label determined to be non-speech is mapped to the non-speech value (the non-speech value being 0).

The apparatus may further include wherein the at least one processor is configured to read the program code and operate as instructed by the program code to sample the set of speakers with N utterances for each speaker to generate a speaker subset including the speaker and a corresponding speech label, and add a first utterance of the speaker and the corresponding speech label to the input stream and the output EESD labels.

The apparatus may further include wherein the at least one processor is configured to read the program code and operate as instructed by the program code to control an overlap length between a current utterance and a corresponding segment of the input stream based on a random variable.

The apparatus may further include wherein the at least one processor is configured to read the program code and operate as instructed by the program code to train the neural network by: splitting the input stream into segments; performing neural clustering on each of the segments; and assigning each of the segments an existing cluster ID or a new cluster ID based on a predetermined distance threshold.

According to another aspect of the disclosure, a non-transitory computer readable medium storing instructions that are executed by at least one processor of an apparatus for end-to-end speaker diarization (EESD) using neural speaker clustering. The instructions cause the at least one processor to generate a set of speech labels corresponding to a set of speakers based on an input stream, wherein a speech label indicates whether dialogue of a speaker is speech or non-speech, generate dialogue based on the set of speakers, extract speaker embeddings from the dialogue, map the speaker embeddings to a cluster identification (ID), an overlapped speech value, or a non-speech value based on a neural network, and output EESD labels based on the mapping.

The non-transitory computer readable medium may further include wherein the instructions further cause the at least one processor to determine a speech label in the set of speech labels to be non-speech when a value of the speech label is 0; and determine a speech label in the set of speech labels to be speech when the value of the speech label is 1.

The non-transitory computer readable medium may further include wherein the instructions further cause the at least one processor to convert the speech label in the set of speech labels determined to be speech into an absolute speaker label.

The non-transitory computer readable medium may further include wherein a speaker embedding corresponding to the absolute speaker label is mapped to the cluster ID, a speaker embedding corresponding to the speech label determined to be speech is mapped to the overlapped speech value, the overlapped speech value being 1, and a speaker embedding corresponding to the speech label determined to be non-speech is mapped to the non-speech value, the non-speech value being 0.

The non-transitory computer readable medium may further include wherein the instructions further cause the at least one processor to sample the set of speakers with N utterances for each speaker to generate a speaker subset including the speaker and a corresponding speech label, add a first utterance of the speaker and the corresponding speech label to the input stream and the output EESD labels, and control an overlap length between a current utterance and a corresponding segment of the input stream based on a random variable.

The non-transitory computer readable medium may further include wherein the instructions further cause the at least one processor to train the neural network by: splitting the input stream into segments, performing neural clustering on each of the segments, assigning each of the segments an existing cluster ID or a new cluster ID based on a predetermined distance threshold.

Additional embodiments will be set forth in the description that follows and, in part, will be apparent from the description, and/or may be realized by practice of the presented embodiments of the disclosure.

BRIEF DESCRIPTION OF THE DRAWINGS

The above and other aspects, features, and aspects of embodiments of the disclosure will be more apparent from the following description taken in conjunction with the following accompanying drawings.

DETAILED DESCRIPTION

Figure 1:
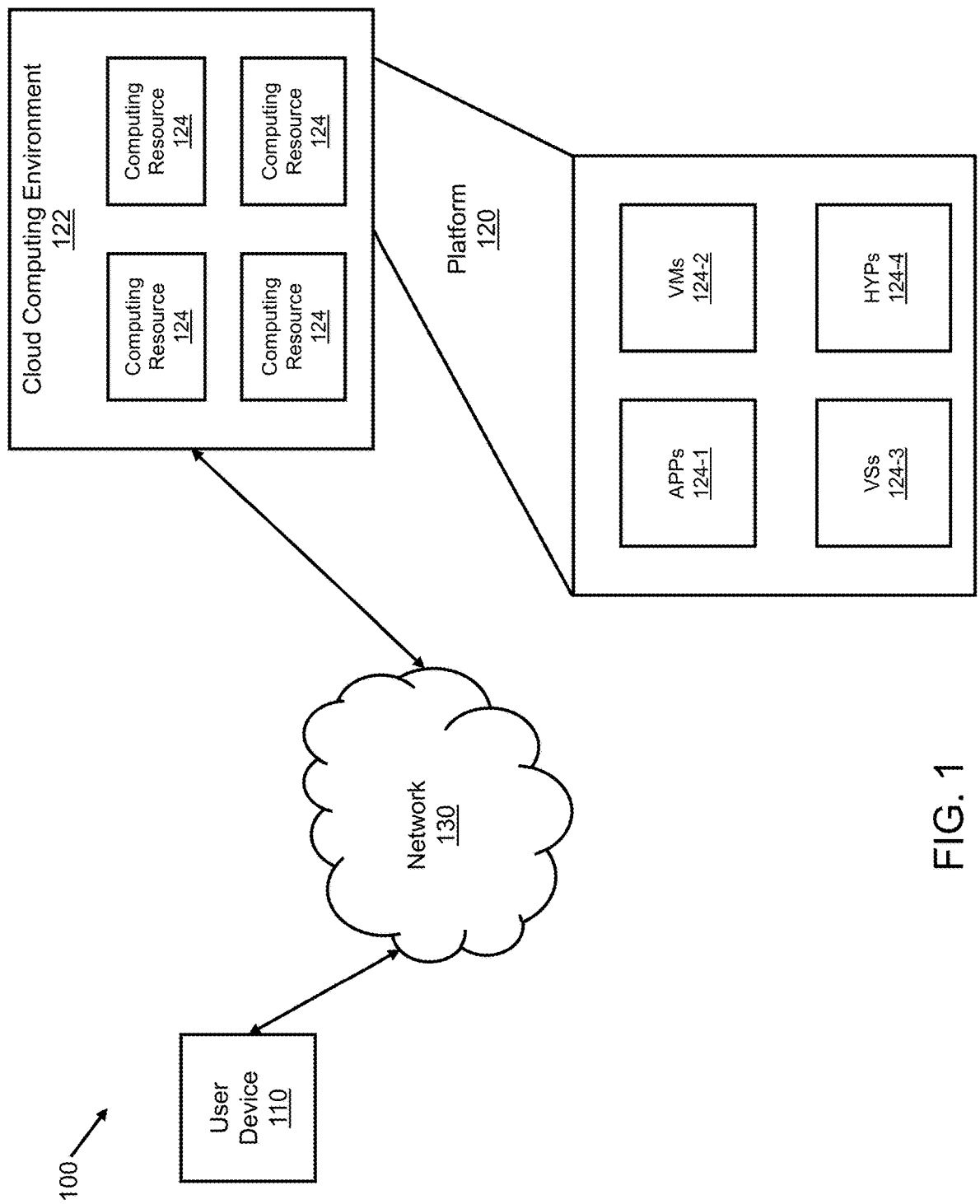
FIG. 1 is a diagram of devices of a system according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and an apparatus in a speaker diarization system. The speaker diarization system is simplified to contain two major parts. That is, a speaker embedding extractor followed by a clustering module. Both parts are implemented with neural networks. In the training phase, an on-the-fly spoken dialogue generator is designed to provide the system with audio streams and the corresponding annotations in categories of non-speech, overlapped speech, and active speakers. A chunk-wise inference and a speaker verification based tracing module are conducted to handle the arbitrary number of speakers. Additionally, the proposed speaker diarization system is able to integrate SAD, overlapped speech detection (OSD), and speaker segmentation/clustering while yielding competitive results. For inference in streaming mode (i.e., while automatically identifying audio and video streams), the audio stream is divided into chunks of a fixed length to generate predictions. The chunk-wise prediction and speaker embedding of the chuck of the audio stream is further processed in a speaker-tracing and post-processing module to handle an unknown number of speakers and long audio streams encountered in speaker diarization.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
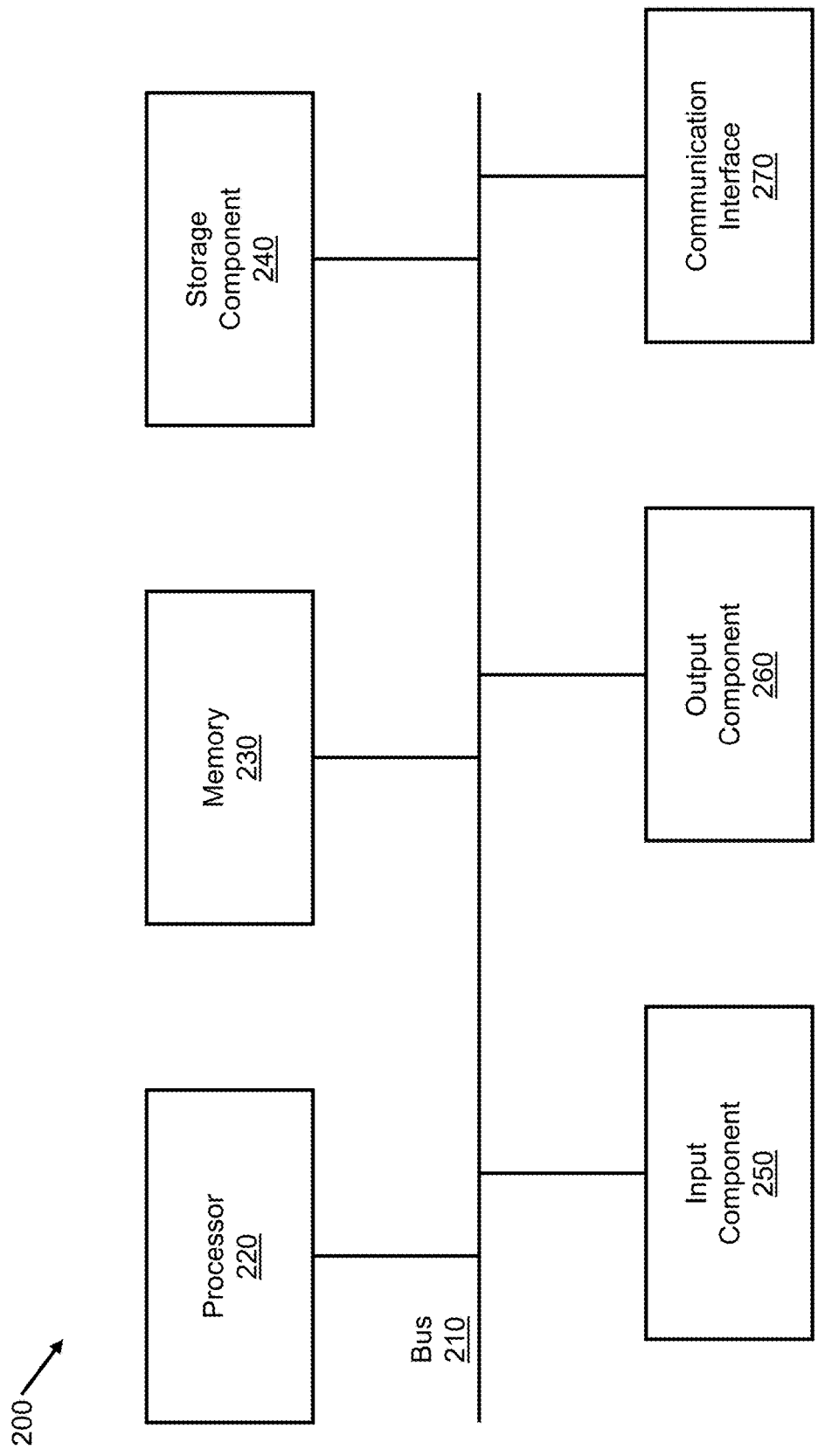
FIG. 2 is a diagram of components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

In embodiments, any one of the operations or processes of FIGS. 3-7 may be implemented by or using any one of the elements illustrated in FIGS. 1 and 2.

A method and an apparatus for an end-to-end speaker diarization (EESD) framework will now be described in detail with reference to FIGS. 3-5 of the embodiment. The EESD is described based on a generalized neural speaker clustering method that can perform SAD, OSD and speaker segmentation/clustering simultaneously.

Figure 3:
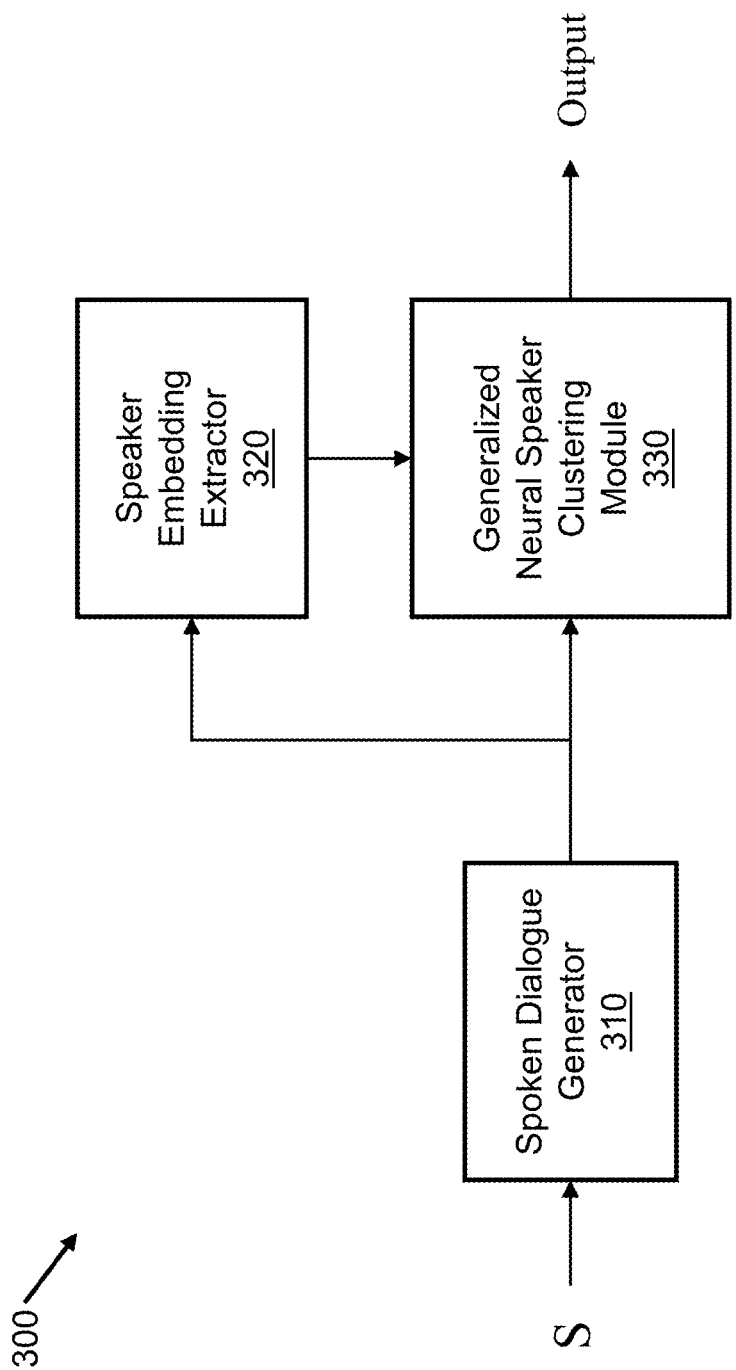
FIG. 3 is a block diagram of an end-to-end speaker diarization (EESD) system according to an embodiment.

FIG. 3 is a block diagram of an EESD system 300, in an inference stage, according to an embodiment. The system includes a spoken dialogue generator 310, a speaker embedding extractor 320, and a generalized neural speaker clustering module 330.

The spoken dialogue generator 310 is responsible for providing an audio mixture X and corresponding label Y. As a key procedure to control what is learned with the EESD, it is critical for the spoken dialogue generator 310 to simulate realistic dialogues. An example of a generation algorithm of the spoken dialogue generator 310, according to an embodiment, is presented in Table 1 below.

TABLE 1

Spoken Dialogue Generator Algorithm

```
Input: {S, L}                        // set of spk, SAD labels
Output: {X, Y}                       // dialogue, EESD labels
/* Initialization:                                          */
1 Sample N_spk spk with N_utt utt/spk to subset S',         */
  /* N_spk ∈ [2, 4], N_utt ∈ [2,5]
2 (S', L') ← (S, L), shuffle (S', L')
3 X.add{S'[0]}, Y.add {F_S2S(L'[0])}
  /* Accumulate spoken dialogue:                            */
4 for u = 1 to N_S'.                 // N_S': number of utt in S'
5 do
6 | L = -min(d, 0)                   // overlap length
  | /* L = len(S'[u] ∩ [X], d ~ N(μ, σ²)                    */
7 | X.add{S'[u]}, Y.add{F_S2S(L'[u])}
8 | if len(X) ≥ 60s then
9 |   X = Chunk(X), Y = Chunk(Y)
10 Y ← EESD_labeling(Y)              // label mapping
```

Given a set of speakers S, the spoken dialogue generator 310 first produces frame-level SAD labels L. For each audio mixture and label pair (X, Y), a speaker subset (S', L') is generated by randomly sampling Nspk speakers with Nutt utterances per speaker. The generation process starts by adding the first utterance of S' and its corresponding SAD label L to the audio mixture and label pair (X, Y). Originally, SAD labels only contain values of "0" and "1" indicating non-speech and speech, respectively. In order to facilitate speaker clustering, all the "1" SAD labels converted to absolute speaker labels, with $F_{S2S}$ (i.e., speech to speaker labels), and all the "0" label are kept unchanged. Each cluster may be assigned a cluster ID. For the utterances in the queue S', a random variable L is employed to control the overlap length between current utterance S'[u] and the audio mixture X, where L is determined by min(d, 0). The random variable d follows a Gaussian distribution parameterized by mean μ and standard deviation cy, which is tuned to control the overlapping rate in the generated audio. To this end, the spoken dialogue generator 310 provides on-the-fly spoken dialogue generation with non-speech, overlapped speech, and speaker labels.

The speaker embedding extractor 320 extracts speaker embeddings from the entire dialogue. The speaker embedding extractor 320 may be, e.g., a TDNN, a Resnet-34, or a ECAPA-TDNN, the impacts of which are investigate on the speaker diarization performance in EESD and later detailed.

Given the extracted speaker embeddings, the generalized neural speaker clustering module 330 assigns labels to the non-speech, single-talker or overlapped speech segments. Specifically, the generalized neural speaker clustering module 330 maps a single-speaker embedding (representing absolute speaker information) to its relative cluster ID, while retaining straight forward mapping for non-speech ("Ns") to "0" and overlapped speech ("Ov") to "1". The output EESD labeling method for generalized neural speaker clustering, by further incorporating a discriminative neural cluster labeling method, is shown in FIG. 4.

Figure 4:
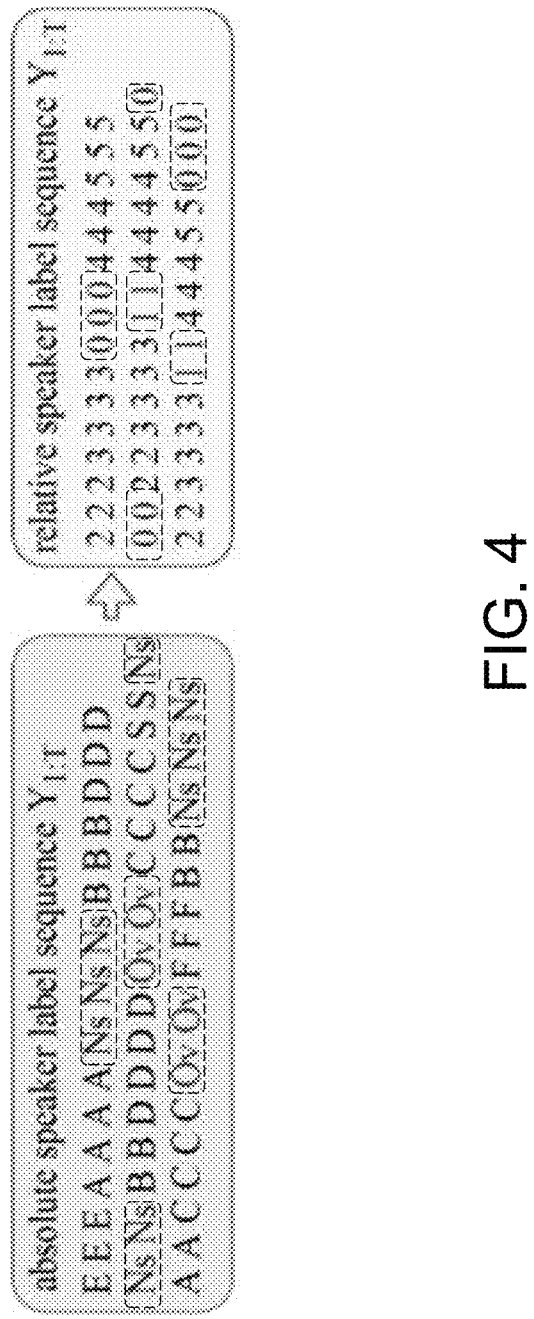
FIG. 4 illustrates an end-to-end speaker diarization (EESD) labeling example according to an embodiment.

As shown in FIG. 4, the absolute speaker label is converted to the relative speaker label sequence wherein the Ns is "0" and the Ov is "1". The Ns and Ov and the corresponding converted "0" and "1", respectively, are indicated by dashed lines (for illustrative purposes). The generalized neural speaker clustering module 330 requires segment level labels per embedding. Embodiments explore two different methods to convert frame-level labels to segment-level labels: one-hot encoding, which operates argmax to find the most frequent labels in T consecutive frames to represent the embedding; and k-hot encoding, which maps frequencies to soft probabilities.

Figure 5:
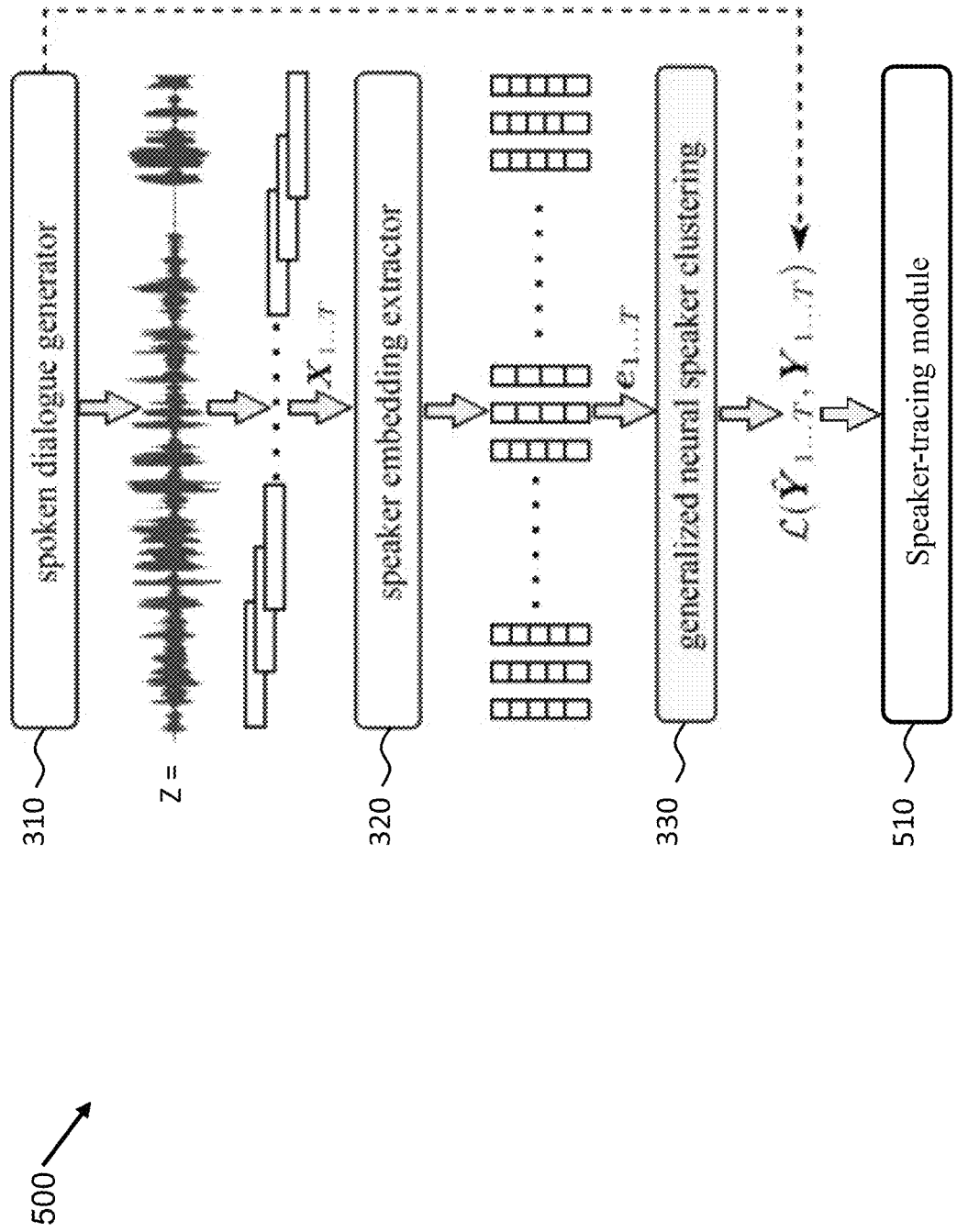
FIG. 5 is a block diagram of an end-to-end speaker diarization (EESD) training process according to an embodiment.

FIG. 5 is a block diagram of an EESD system training apparatus 500 according to an embodiment. Maximum likelihood (ML) may be used as the training objective in the sequential EESD labeling model. However, the specific type of ML is flexible and may be chosen according to the networks. The spoken dialogue generator 310 simulates dialogues with non-speech, overlapped speech, and active speaker labels, and thus facilitating the training of the neural clustering. Speaker verification based causal tracing is also introduced in the training process to flexibly handle a (unknown) number of speakers and account for long audio streams encountered in the speaker diarization system.

As shown in FIG. 5, the EESD system training apparatus 500 includes the spoken dialogue generator 310, the speaker embedding extractor 320, the generalized neural speaker clustering module 330, and a speaker-tracing module 510. The spoken dialogue generator 310, the speaker embedding extractor 320, the generalized neural speaker clustering module 330 may be the same or different from those described in the inference processes with reference to FIG. 3.

In the neural clustering training process, a maximum cluster number C is set. The maximum cluster number C constraints the EESD system when processing long recordings with unknown speaker numbers. The speaker verification based casual speaker-tracing is implemented to solve the issue. Given a long recording Z, it can split it to fixed-length chunks $X_{1 \ldots T}$ and neural speaker clustering is performed for each chunk. A speaker-tracing module 550 processes and connects a decoded result $\hat{Y}_t$ of each chunk. A high-level description of speaker-tracing algorithm, according to an embodiment, is presented in Table 2 below.

TABLE 2

Casual Speaker-tracing Algorithm

```
Input: {e^i, Ŷ^i, Ŷ^{0:i-1}, spk_dict}
/* Input for chunk i                                    */
Output: {Ŷ^{0:i}, spk_dict}             // uodate to i
/* Initialization:                                      */
1  find mean embd E ∈ R^{J×D} with J-1 spk change points in
   Ŷ^i, EESD segmentation index (Idx_j^s, Idx_j^e),
/* speaker-tracing in chunk i:                          */
2  for j = 1 to J do
3  |   if Ŷ^i [Idx_j^s] ≥ 1 then
   |   |   /* only tracing single-spk                   */
4  |   |   spk_dict, rewrite_id = SV (E[j],spk_dict,Th)
5  |   |   Ŷ^i [Idx_j^s : Idx_j^e] = rewrite_id
   ⌊
6  Ŷ^{0:i} = Ŷ^{0:i-1} + Ŷ^i           // append updated Y^i
```

An empty dictionary spk_dict, with a key to represent the cluster ID and a value to represent the corresponding speaker embedding, is initialized. A core part of the speaker-tracing algorithm is the SV function. The SV function is used to decide whether speaker embedding E [j] should be assigned to a new cluster ID or to an existing cluster ID in the spk_dict. The decision is made by calculating the cosine distance between the speaker embedding E [j] and an existing cluster centroid. If the minimum distance is less than a predefined threshold Th (e.g., Th=0.5), the jth segment in chunk i is assigned to the existing cluster ID. Otherwise, a new cluster ID is assigned to segment j.

Figure 6:
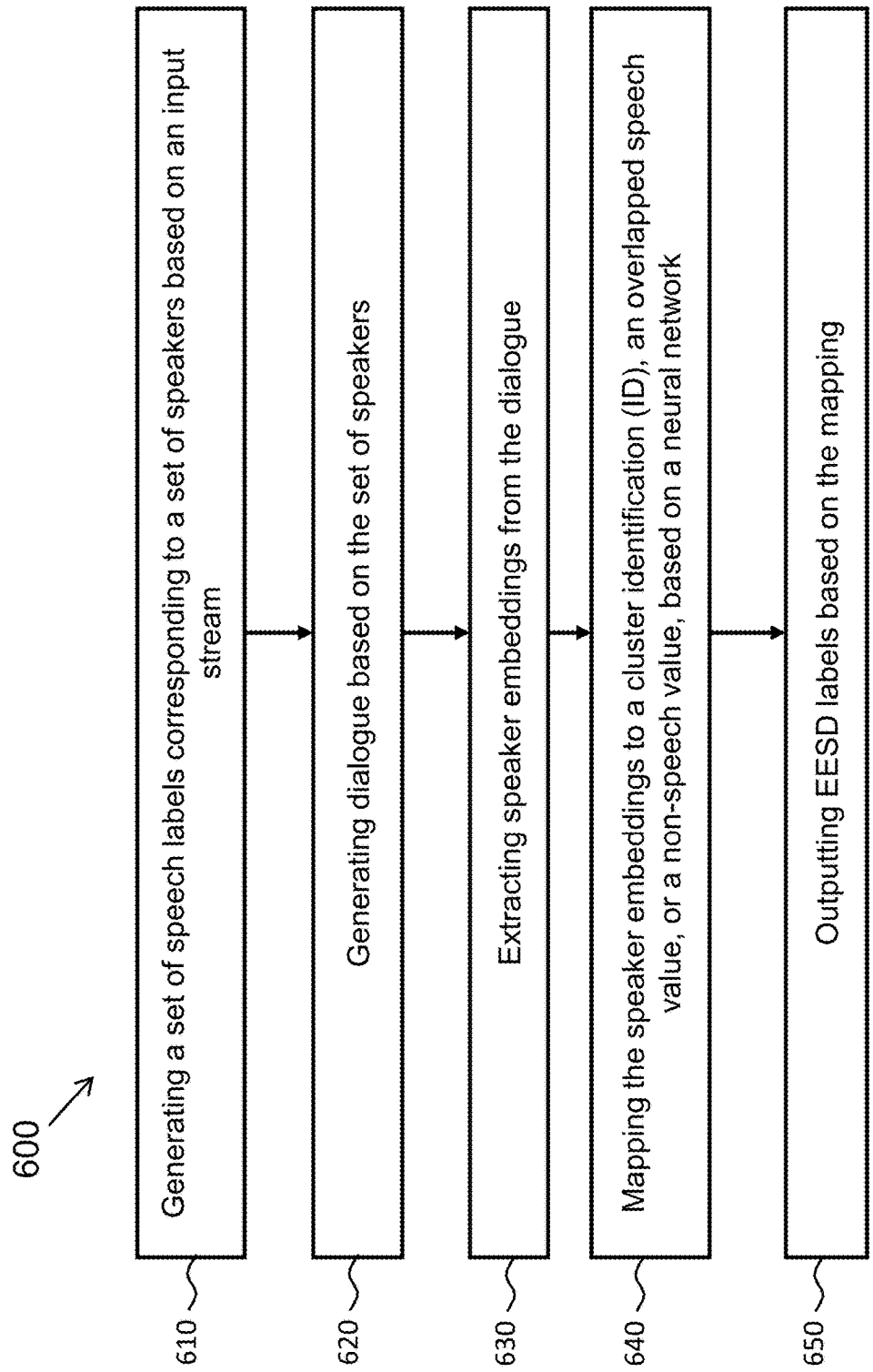
FIG. 6 is a flowchart of a method of end-to-end speaker diarization (EESD), according to an embodiment.

FIG. 6 is an exemplary flowchart illustrating a method 600, performed by at least one processor, for EESD using neural speaker clustering, according to an embodiment. In some implementations, one or more process blocks of FIG. 6 may be performed by the platform 120. In some implementations, one or more process blocks of FIG. 6 may be performed by another device or a group of devices separate from or including the platform 120, such as the user device 110.

In operation 610, the method 600 includes generating a set of speech labels corresponding to a set of speakers based on an input stream. A speech label indicates whether dialogue of a speaker is speech or non-speech. A speech label is determined to be non-speech when a value of the speech label is 0 and it is determined to be speech when the value of the speech label is 1.

In operation 620, the method 600 includes generating dialogue based on the set of speakers.

In operation 630, the method 600 includes extracting speaker embeddings from the dialogue.

In operation 640, the method 600 includes mapping the speaker embeddings to a cluster ID, an overlapped speech value, or a non-speech value, based on a neural network. A speech label in the set of speech labels determined to be speech may be converted into an absolute speaker label. Then, a speaker embedding corresponding to the absolute speaker label is mapped to the cluster ID, a speaker embedding corresponding to the speech label determined to be speech is mapped to the overlapped speech value (the overlapped speech value being 1), and a speaker embedding corresponding to the speech label determined to be non-speech is mapped to the non-speech value (the non-speech value being 0).

Further, the set of speakers may be sampled with N utterances for each speaker to generate a speaker subset including the speaker and the corresponding speech label. The first utterance of the speaker and the corresponding speech label are added to the input stream and the output EESD labels. Speech overlap may be controlled between a current utterance and a corresponding segment of the input stream based on a random variable.

In operation 650, the method 600 includes outputting EESD labels based on the cluster mapping in operation 640.

Although FIG. 6 shows example operations of the method, in some implementations, the method may include additional operations, fewer operations, different operations, or differently arranged operations than those depicted in FIG. 6. Additionally, or alternatively, two or more of the operations of the method may be performed in parallel or combined.

Figure 7:
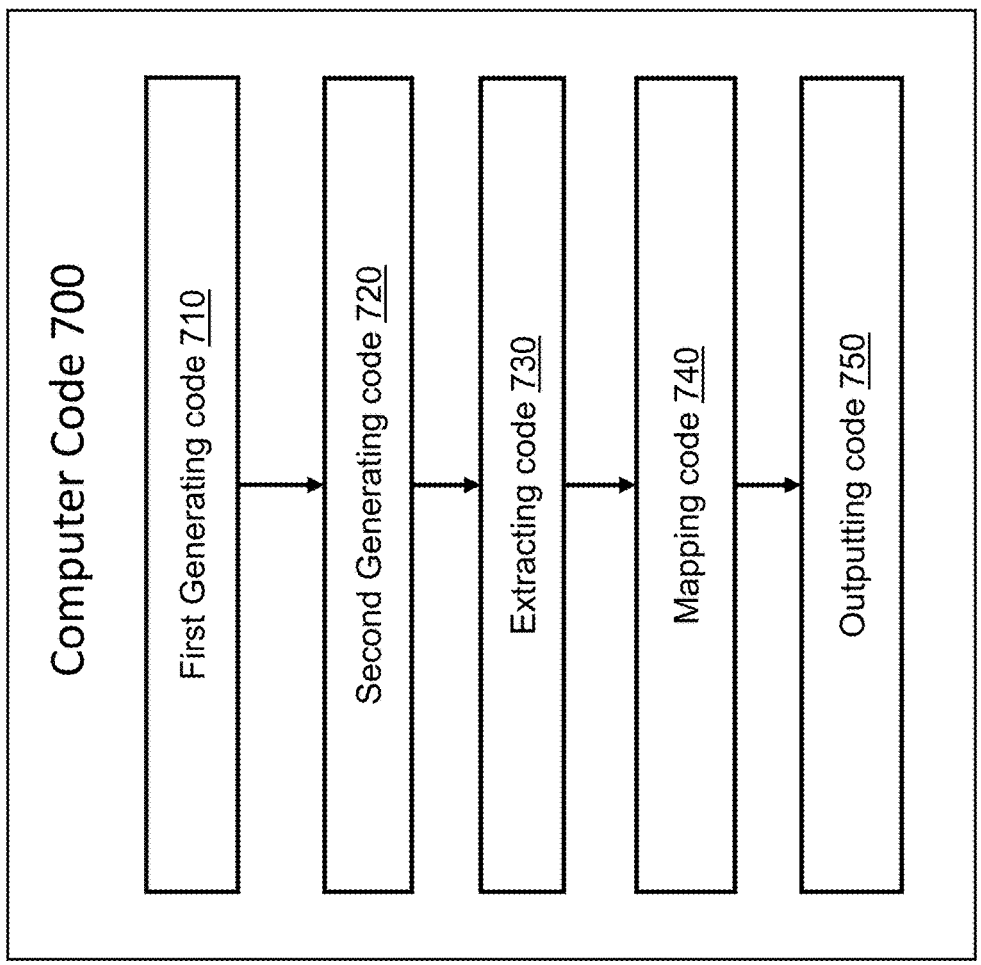
FIG. 7 is a block diagram of end-to-end speaker diarization (EESD), according to an embodiment.

FIG. 7 is a block diagram of an example of computer code for EESD, according to one or more embodiments. According to embodiments of the present disclosure, an apparatus/device including at least one processor with memory storing computer code may be provided. The computer code may be configured to, when executed by the at least one processor, perform any number of aspects of the present disclosure.

As shown in FIG. 7, the computer code 700 includes first generating code 710, second generating code 720, extracting code 730, mapping code 740, and outputting code 750.

The first generating code 710 is configured to cause the at least one processor to generate a set of speech labels corresponding to a set of speakers based on an input stream, wherein a speech label indicates whether dialogue of a speaker is speech or non-speech.

The second generating code 720 is configured to cause the at least one processor to generate dialogue based on the set of speakers.

The extracting code 730 is configured to cause the at least one processor to extract speaker embeddings from the dialogue.

The mapping code 740 is configured to cause the at least one processor to map the speaker embeddings to a cluster identification (ID), an overlapped speech value, or a non-speech value, based on a neural network.

The outputting code 750 is configured to cause the at least one processor to output EESD labels based on the mapping.

The computer code 700 may further include first determination code configured to cause the at least one processor to determine a speech label in the set of speech labels to be non-speech when a value of the speech label is 0, second determination code configured to cause the at least one processor to determine a speech label in the set of speech labels to be speech when a value of the speech label is 1, and converting code configured to cause the at least one processor to convert a speech label in the set of speech labels determined to be speech into an absolute speaker label.

The computer code 700 may even further include training code configured to cause the at least one processor to train the neural network. Specifically, one or more computer code configured to cause the at least one processor to split the input stream into segments, perform neural clustering on each segment, and assign the neural clustered segment an existing cluster ID or a new cluster ID based on a predetermined distance threshold.

Although FIG. 7 shows example blocks of the computer code 700 of a system or apparatus according to embodiments, in some implementations, the system may include additional blocks, fewer blocks, different blocks, or differently arranged blocks than those depicted in FIG. 7. Additionally, or alternatively, two or more of the blocks of the system may be combined. In other words, while FIG. 7 shows distinct blocks of code, the various code instructions need not be distinct and could be intermingled.

Advantages of the methods and systems described according to embodiments of this disclosure are demonstrated below. Results on VoxConverse20 Dev and a VoxConverse20 test set are provided in Table 3 to show how individual components perform in EESD with a generalized neural speaker clustering method and its impact to speaker diarization. For SAD and OSD, the results are based on an ECAPA-TDNN embedding extractor. The Table 3 shows the accuracy, false alarm error (FA), and miss error (MI) for SAD. For speaker diarization, Diarization Error Rate (DER) is used as the system metric.

TABLE 3

Frame-level SAD vs. EESD SAD (non-s >0.6 s, in %)

| test set | $SAD_{tdnn}$ | | | EESD SAD | | |
|---|---|---|---|---|---|---|
| | Acc | FA | MI | Acc | FA | MI |
| VoxCon Dev | 95.3 | 3.5 | 1.2 | 95.7 | 3.4 | 0.9 |
| VoxCon Test | 94.4 | 4.3 | 1.3 | 94.5 | 4.5 | 1.0 |

As illustrated in Table 3, in contrast with the frame-level SADtdnn system, the EESD SAD achieves comparable performance in speech detection for both VoxConverse20 Dev and the VoxConverse20 test set. It is worth to note that the data augmentation at the spoken dialogue level is crucial to reduce the FA for VoxConverse20 Dev and in the VoxConverse20 test set.

As the overlapped speech ratio is only around 3% for VoxConverse20 Dev and VoxConverse20 Dev test set, embodiments of the present disclosure result in increased precision and recall. Three different ($\mu$, $\sigma$) parameter pairs are illustrated in Table 4. As shown in Table 4, generating more overlaps in the training helps to find the actual overlapped speech.

TABLE 4

SD Results with Different Configurations (in %)

| spk embd | label smo. | L | D-AHC | DER (dev) | DER (test) |
|---|---|---|---|---|---|
| TDNN | No | 1.6 s | No | 12.5 | 16.7 |
| TDNN | Yes | 1.3 s | No | 11.6 | 15.2 |
| TDNN | Yes | 1.3 s | Yes | 9.4 | 12.5 |
| Resnet-34 | Yes | 1.3 s | Yes | 8.6 | 11.6 |
| ECAPA-TDNN | Yes | 1.3 s | Yes | 7.3 | 10.9 |
| Kaldi (improved) | | | | 6.3 | 9.8 |
| VoxCon [16, 28] | | | | 7.7 | 21.8 |
| BUT [13, 16] | | | | 4.0 | 8.1(fusion) |
| Microsoft [14] | | | | 3.8 | 6.2(fusion) |

The speaker diarization results of the proposed EESD systems are listed in Table 4. From the results, the best model is able to outperform the audio-visual speaker diarization system baseline on dev set, and even create a bigger margin on the test set, which indicates that the proposed system has good generalization capabilities between different domains. Compared with the traditional pipeline system (i.e., Kaldi baseline, with the same SAD and speaker embedding extractor), there remains a small gap. Meanwhile, the gap becomes larger when comparing to the state-of-the-art (SOTA) systems reported in prior art. However, the SOTA systems are much more complicated with individual OSD, speech separation, re-clustering/segmentation techniques, etc. As such, embodiments of the present disclosure provide an alternative way to conduct speaker diarization. By achieving promising system performance with a simplified inference pipeline as described herein, it is possible to stimulate more variations to continue to improve the challenges in speaker diarization tasks.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of end-to-end speaker diarization (EESD) using neural speaker clustering, performed by at least one processor and comprising:
    generating a set of speech labels corresponding to a set of speakers based on an input stream, wherein a speech label indicates whether dialogue of a speaker is speech or non-speech;
    generating dialogue based on the set of speakers;
    extracting speaker embeddings from the dialogue;
    mapping the speaker embeddings to a cluster identification (ID), an overlapped speech value, or a non-speech value, based on a neural network; and
    outputting EESD labels based on the mapping,
    wherein the method further comprises:
        sampling the set of speakers with N utterances for each speaker to generate a speaker subset including the speaker and a corresponding speech label;
        adding a first utterance of the speaker and the corresponding speech label to the input stream and the output EESD labels; and
        controlling an overlap length between a current utterance and a corresponding segment of the input stream based on a random variable L, where L is determined by a minimum value from among d or 0 (min (d,0)), where d follows a Gaussian distribution parameterized by mean $\mu$ and standard deviation $\sigma$.

2. The method of claim 1, further comprising:
    determining a speech label in the set of speech labels to be non-speech when a value of the speech label is 0; and
    determining a speech label in the set of speech labels to be speech when the value of the speech label is 1.

3. The method of claim 2, further comprising:
    converting the speech label in the set of speech labels determined to be speech into an absolute speaker label.

4. The method of claim 3, wherein a speaker embedding corresponding to the absolute speaker label is mapped to the cluster ID,
    a speaker embedding corresponding to the speech label determined to be speech is mapped to the overlapped speech value, the overlapped speech value being 1, and
    a speaker embedding corresponding to the speech label determined to be non-speech is mapped to the non-speech value, the non-speech value being 0.

5. The method of claim 1, further comprising training the neural network by:
    splitting the input stream into segments;
    performing neural clustering on each of the segments; and
    assigning each of the segments an existing cluster ID or a new cluster ID based on a predetermined distance threshold.

6. A apparatus for end-to-end speaker diarization (EESD) using neural speaker clustering, the apparatus comprising:

at least one memory configured to store program code; and at least one processor configured to read the program code and operate as instructed by the program code, the program code configured to case the at least one processor to:

generate a set of speech labels corresponding to a set of speakers based on an input stream, wherein a speech label indicates whether dialogue of a speaker is speech or non-speech;

generate dialogue based on the set of speakers;

extract speaker embeddings from the dialogue;

map the speaker embeddings to a cluster identification (ID), an overlapped speech value, or a non-speech value, based on a neural network; and output EESD labels based on the mapping, wherein the at least one processor is further configured to:

sample the set of speakers with N utterances for each speaker to generate a speaker subset including the speaker and a corresponding speech label;

add a first utterance of the speaker and the corresponding speech label to the input stream and the output EESD labels; and control an overlap length between a current utterance and a corresponding segment of the input stream based on a random variable L, where L is determined by a minimum value from among d or 0 (min (d,0)), where d follows a Gaussian distribution parameterized by mean μ and standard deviation σ.

7. The apparatus of claim 6, wherein the at least one processor is configured to read the program code and operate as instructed by the program code to:

determine a speech label in the set of speech labels to be non-speech when a value of the speech label is 0; and determine a speech label in the set of speech labels to be speech when the value of the speech label is 1.

8. The apparatus of claim 7, wherein the at least one processor is configured to read the program code and operate as instructed by the program code to:

convert the speech label in the set of speech labels determined to be speech into an absolute speaker label.

9. The apparatus of claim 8, wherein a speaker embedding corresponding to the absolute speaker label is mapped to the cluster ID, a speaker embedding corresponding to the speech label determined to be speech is mapped to the overlapped speech value, the overlapped speech value being 1, and a speaker embedding corresponding to the speech label determined to be non-speech is mapped to the non-speech value, the non-speech value being 0.

10. The apparatus of claim 6, wherein the at least one processor is configured to read the program code and operate as instructed by the program code to train the neural network by:

splitting the input stream into segments;

performing neural clustering on each of the segments; and assigning each of the segments an existing cluster ID or a new cluster ID based on a predetermined distance threshold.

11. A non-transitory computer-readable medium storing instructions that, when executed by at least one processor of an apparatus for end-to-end speaker diarization (EESD) using neural speaker clustering, cause the at least one processor to:

generate a set of speech labels corresponding to a set of speakers based on an input stream, wherein a speech label indicates whether dialogue of a speaker is speech or non-speech;

generate dialogue based on the set of speakers;

extract speaker embeddings from the dialogue;

map the speaker embeddings to a cluster identification (ID), an overlapped speech value, or a non-speech value, based on a neural network; and output EESD labels based on the mapping, wherein the non-transitory computer-readable medium storing instructions cause the at least one processor to:

sample the set of speakers with N utterances for each speaker to generate a speaker subset including the speaker and a corresponding speech label;

add a first utterance of the speaker and the corresponding speech label to the input stream and the output EESD labels; and control an overlap length between a current utterance and a corresponding segment of the input stream based on a random variable L, where L is determined by a minimum value from among d or 0 (min (d,0)), where d follows a Gaussian distribution parameterized by mean μ and standard deviation σ.

12. The non-transitory computer-readable medium of claim 11, wherein the instructions further cause the at least one processor to:

determine a speech label in the set of speech labels to be non-speech when a value of the speech label is 0; and determine a speech label in the set of speech labels to be speech when the value of the speech label is 1.

13. The non-transitory computer-readable medium of claim 12, wherein the instructions further cause the at least one processor to:

convert the speech label in the set of speech labels determined to be speech into an absolute speaker label.

14. The non-transitory computer-readable medium of claim 13, wherein a speaker embedding corresponding to the absolute speaker label is mapped to the cluster ID, a speaker embedding corresponding to the speech label determined to be speech is mapped to the overlapped speech value, the overlapped speech value being 1, and a speaker embedding corresponding to the speech label determined to be non-speech is mapped to the non-speech value, the non-speech value being 0.

15. The non-transitory computer-readable medium of claim 11, wherein the instructions further cause the at least one processor to train the neural network by:

splitting the input stream into segments;

performing neural clustering on each of the segments; and assigning each of the segments an existing cluster ID or a new cluster ID based on a predetermined distance threshold.

\* \* \* \* \*